US006990320B2

(12) United States Patent
LeCren

(10) Patent No.: US 6,990,320 B2
(45) Date of Patent: Jan. 24, 2006

(54) DYNAMIC REALLOCATION OF PROCESSING RESOURCES FOR REDUNDANT FUNCTIONALITY

(75) Inventor: Andrew Thomas LeCren, North Richland Hills, TX (US)

(73) Assignee: Motorola, Inc., Schaumburg, IL (US)

( * ) Notice: Subject to any disclaimer, the term of this patent is extended or adjusted under 35 U.S.C. 154(b) by 613 days.

(21) Appl. No.: 10/083,419

(22) Filed: Feb. 26, 2002

(65) Prior Publication Data

US 2003/0162503 A1 Aug. 28, 2003

(51) Int. Cl.
*H04B 17/00* (2006.01)

(52) U.S. Cl. ................... 455/67.11; 455/423; 455/424; 455/445; 455/448; 455/552.1; 455/561; 455/452.1; 455/452.2; 714/10; 714/13; 370/225; 370/228; 370/241; 370/242; 379/279

(58) Field of Classification Search ........ 455/423–425, 455/67.11, 67.13, 67.7, 67.16, 550.1, 552.1, 455/428, 13, 445–448, 527, 561, 452.1–2; 714/10, 13, 4; 370/241–242, 225–228; 379/279; 709/203, 315–318
See application file for complete search history.

(56) References Cited

U.S. PATENT DOCUMENTS

| | | | | |
|---|---|---|---|---|
| 4,654,846 | A * | 3/1987 | Goodwin et al. | 714/13 |
| 4,823,256 | A * | 4/1989 | Bishop et al. | 714/10 |
| 5,226,152 | A * | 7/1993 | Klug et al. | 714/12 |
| 5,491,787 | A * | 2/1996 | Hashemi | 714/11 |
| 5,530,908 | A * | 6/1996 | Rozenstrauch et al. | 455/8 |
| 5,796,937 | A * | 8/1998 | Kizuka | 714/13 |
| 5,898,829 | A * | 4/1999 | Morikawa | 714/47 |
| 5,953,676 | A * | 9/1999 | Berry et al. | 455/564 |
| 6,556,672 | B1 * | 4/2003 | Holland et al. | 379/279 |
| 6,711,407 | B1 * | 3/2004 | Cornils | 455/428 |
| 6,775,542 | B1 * | 8/2004 | Vilander et al. | 455/423 |

* cited by examiner

*Primary Examiner*—Nick Corsaro
*Assistant Examiner*—Tuan Tran
(74) *Attorney, Agent, or Firm*—Kevin D. Wills

(57) ABSTRACT

A method of and multi-processor based apparatus for dynamically reallocating processors to provide redundant functionality, the method including detecting a fault in a first function having a first priority, the first function supported by a first processor; selecting a second processor supporting a second function having a second priority; and reallocating, responsive to the fault, the second processor to support the first function when a predetermined relationship corresponding to the first priority and the second priority exists, this relationship including, for example, one or more of the first exceeding the second priority and the type and frequency of occurrence of the fault.

9 Claims, 4 Drawing Sheets

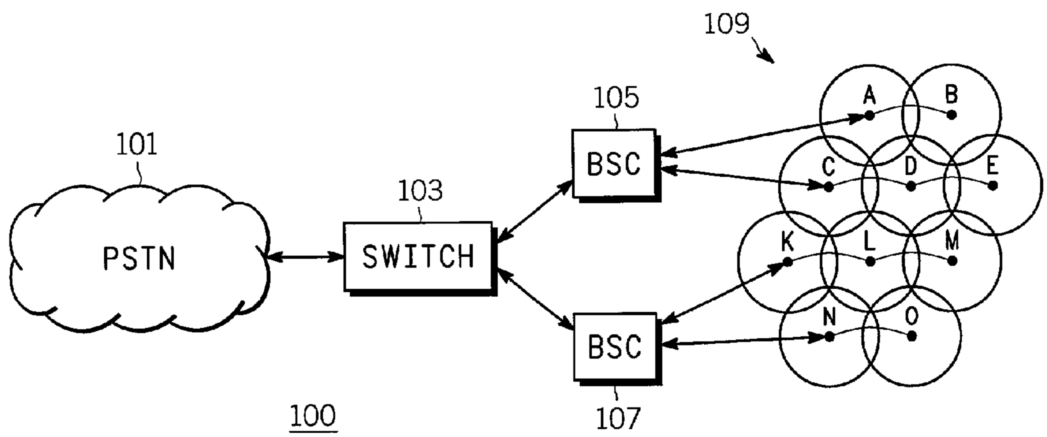
*FIG. 1*
*FIG. 2*
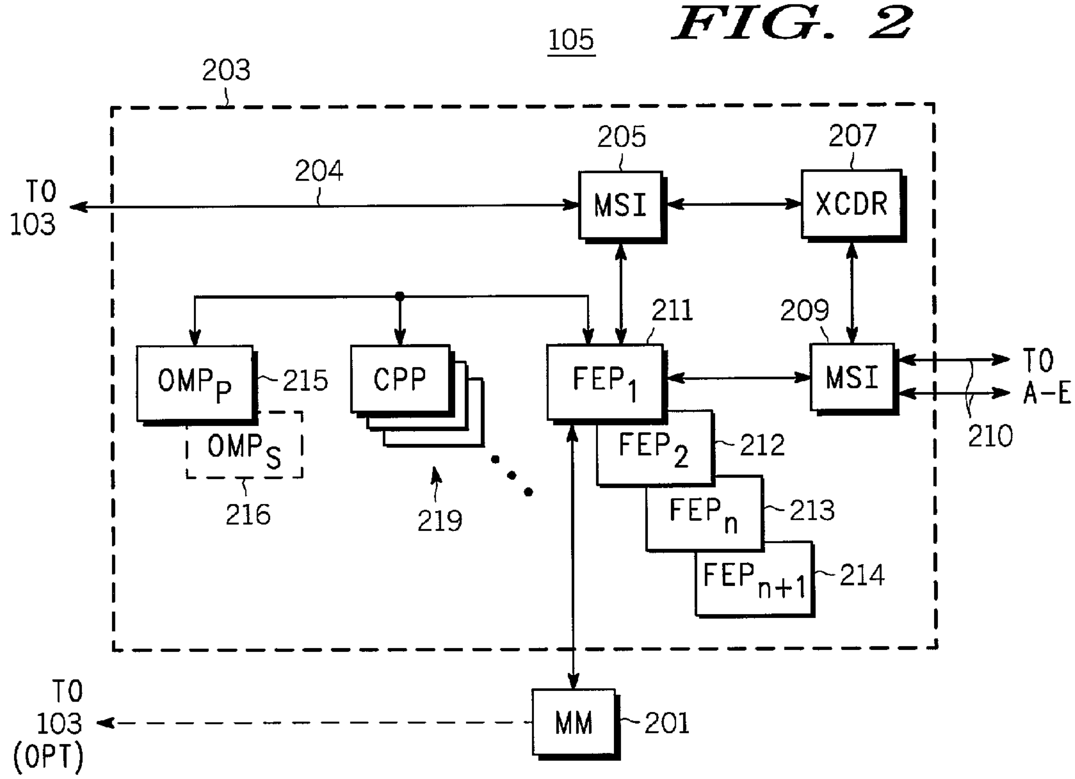

DYNAMIC REALLOCATION OF PROCESSING RESOURCES FOR REDUNDANT FUNCTIONALITY

FIELD OF THE INVENTION

This invention relates in general to communication systems, and more specifically to a method and apparatus for dynamically reallocating processing resources for redundant functionality.

BACKGROUND OF THE INVENTION

Complex systems, such as large communications systems and the like are inevitably subject to failure. At the same time customer satisfaction and simple economics dictate that these systems be available all or nearly all of the time. Network operators and network equipment suppliers often refer to this as high availability systems or service meaning that a significant percentage of customers that utilize these systems will ordinarily find that the services are available.

Manufacturers or equipment suppliers often resort to redundant equipment or redundant subsystems to insure that the systems are available. Generally there are two types of redundancy that are employed. One referred to as 2n or more generally xn redundancy means that for every system or subsystem that is operational or in use often referred to as a primary system or subsystem there is at least one system or subsystem or more generally x−1 redundant or standby systems or subsystems. The second may be referred to as n+1 or more generally n+m redundancy meaning that for every n systems or subsystems that are operational or primary there is one additional standby system or subsystem or more generally m additional standby systems or subsystems. Of course you can utilize a combination such as 2n+1 redundancy where every primary system has one redundant system plus there is one additional redundant system.

The problem that all of these redundancy schemes suffer from is that in the event of a failure of one of the units, either a primary or a standby unit or system the level of redundancy suffers until the failed unit or system is again available. One unattractive solution is simply to increase the level of redundancy to the point that some number of failures can be experienced and still maintain sufficient redundancy to handle any problems or further failures that may occur during resolution of the initial faults or failures. Unfortunately these additional units or systems or subsystems can be an economic burden due of course to there direct cost but also overhead costs such as power supply and physical space plus periodic maintenance or in sum life cycle costs.

Clearly a need exists for methods and apparatus that is suitable for supporting and maintaining redundant equipment requirements by dynamically reallocating available resources for redundant functionality.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 depicts, in a simplified and representative form, a system level block diagram of a cellular communications system;

FIG. 2 depicts, in a representative form, a preferred base site controller suitable for use in the FIG. 1 system and for utilizing an embodiment of dynamic reallocation of processing resources in accordance with the present invention;

DETAILED DESCRIPTION OF PREFERRED EMBODIMENT

Figure 3:
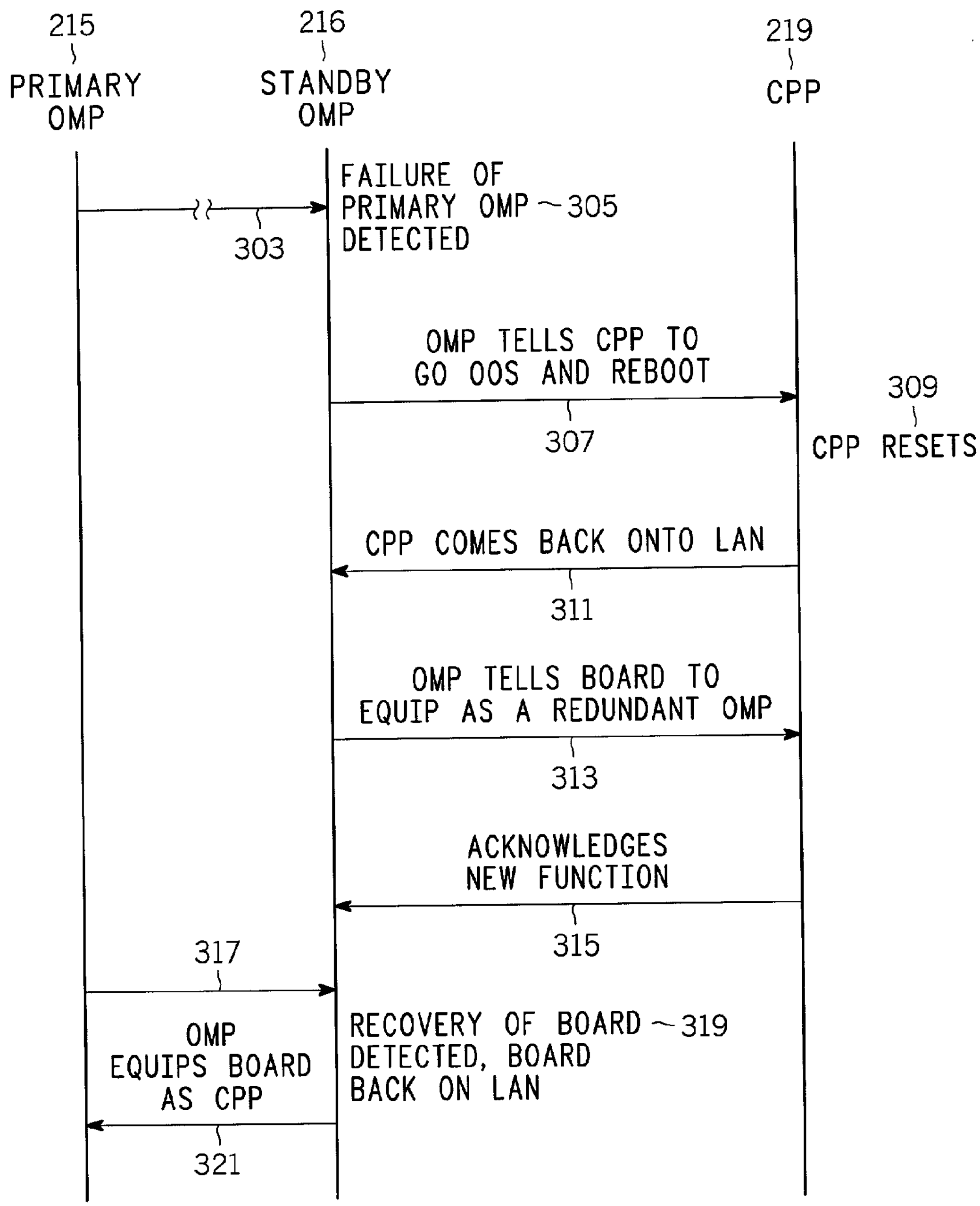
FIG. 3 depicts a ladder diagram showing reallocation of a call processing processor to become an operations and maintenance processor according to the present invention.

In overview form the present disclosure concerns communications systems that provide service to communications units or more specifically user thereof operating therein. More particularly various inventive concepts and principles embodied in methods and apparatus for dynamically reallocating resources, such as processors or processors based resources to provide or maintain redundant functionality are discussed. The communications systems of particular interest are wireless systems supporting substantial numbers of users, such as cellular telephone and the like systems. These systems may be defined by one or more generally known and available standards or specifications that may vary by country or region throughout the world. Some examples of standards include: the Advanced Mobile Phone System (AMPS), the Narrowband Advanced Mobile Phone System (NAMPS), the Global System for Mobile Communication (GSM), the IS-55 Time Division Multiple Access (TDMA) digital cellular, the IS-95 Code Division Multiple Access (CDMA) digital cellular, CDMA 2000, the Personal Communications System (PCS), 3G or WCDMA, General Packet Radio Services (GPRS), IDEN, and variations and evolutions of these protocols, standards, and systems. It is foreseeable that other systems will also be defined to provide wireless communications services for large numbers of users.

As further discussed below various inventive principles and combinations thereof are advantageously employed to dynamically reallocate processing resources as required in order to maintain appropriate levels of redundancy, where the reallocation is, preferably, done in a prioritized basis from lower priority functions to higher priority functions, optionally subject to certain conditions later discussed. Thus alleviation of various problems associated with known systems, such as the probable lack of availability of the system given compound failures is resolved, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and semi custom semiconductor circuits. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and semiconductor circuits with minimal experimentation. Therefore further discussion of such software and circuits, if any, will be limited in the interest of brevity and minimization of any risk of obscuring the principles and concepts in accordance with the present invention.

FIG. 1 depicts, in a simplified and representative form, a system level block diagram of a communications system 100, such as cellular telephone system, coupled to a public network such as the public switched telephone network (PSTN) 101. Generally these systems are known and commercially available in one or more forms from one or more suppliers such as Motorola Inc. of Schaumburg, Ill. They will be discussed here only briefly in order for the reader to better appreciate the inventive principles and concepts discussed further herein below. Generally a switch 103 is used inter alia to route call traffic from the PSTN to a multiplicity of base site controllers (BSCs, two shown) 105, 107. Each of the BSC is coupled to a number of base stations. In the simplified diagram BSC 105 is shown coupled base stations A–E and BSC 107 is shown coupled to base stations K–O. The base stations A–E and K–O are each shown with a coverage area that collectively represent a service area 109.

In actual systems each BSC may be coupled via a point-to-point connection such as a T1 telephony link to each of 10 s or more base stations. Each base station can support a coverage area that is split up into sectors (3 or 6 is typical) and each sector can ordinarily support 10 s of calls simultaneously. At the BSC, certain processor-based resources will be devoted to setting up, tearing down, and handing off each of these calls. Other BSC resources will be required to handle each base station, and still others will be required to operate and maintain the BSC as a whole. From this discussion it will be evident that the resources required for the BSC as a whole are more critical than those required to handle a base station. Similarly the resources to handle a base station are more critical than those to handle a call. From another perspective losing the resources to handle a call may have some impact on capacity whereas losing the resources for a base station means that service is not available in the coverage area for that base station and loosing a BSC means that services are not available in large portion of the service area.

Referring to FIG. 2 a representative block diagram of a preferred BSC 105 used in the FIG. 1 system that is arranged to embody dynamic reallocation of processing resources in accordance with the present invention is depicted. This block diagram is representative in that an actual BSC may have hundreds of blocks with tens of duplicate blocks. Generally each block is indicative of a card including one or more printed circuit boards that in turn include various electrical and electronic functions. Typically these cards are housed in a card cage and the communications paths between the cards will be on a back plane for the card cage all as is known. This diagram is sufficient to explain the basic functions of relevant blocks as well as call processing flows and call traffic flows within the BSC in addition to the inventive principles and concepts regarding dynamic reallocation of processors or processor based resources to provide redundant functionality.

The base station controller (BSC) 105 is for controlling base stations and base station resources, such as transmitters and terrestrial links and for inter-coupling the base stations A–E and the network switch 103 in a wireless phone network 100. The BSC is multi-processor based and arranged and constructed to dynamically reallocate processors to provide redundant functionality within the BSC. The BSC 105 includes a mobility manage 201 for handling all base station resource assignments that is coupled to a transcoder 203 that is responsible for processing and supporting all calls. The mobility manager can optionally be coupled to the switch 103 via a T1 or the like terrestrial link or be coupled to the switch via the transcoder.

The transcoder further includes a number of functional blocks that are devoted to call processing and support. The transcoder includes means for inter-coupling the base stations and the network switch. Once a call is set up, call traffic from or to the switch 103 will be coupled via a multiple serial interface (MSI) card 205 to an X-coder card 207 and then to a further MSI 209 that is coupled via links 210 to one of the base stations A–E. The MSI card 209 terminates the physical transport medium or link 210, usually a T1 or E1 telephony link, to/from the base stations. Similarly the MSI card 205 terminates the link 204, usually a plurality of T1s or E1s to the switch 103. Typically these cards can terminate a plurality of T1s or E1s, such as four such links. Of course each T1 can support a multiplicity of simultaneous calls. The X-coder card 207 performs transcoding between one vocoding protocol, specifically, for example, EVRC (Enhanced Variable Rate Codec) and QCELP (Qualcomm Codebook Excited Linear Prediction), used to transfer data/voice between the BSC and the base stations and a second protocol, specifically standard telephony 64 Killo Pulses per second Pulse Code Modulated data that is used between the BSC and the switch.

With respect to setting up a call there has to be communication between the mobility manager 201 and the transcoder 203 as well as communication between the mobility manager and base stations and switch to be able to successfully set up a call. In particular the BSC is notified by or must notify the switch that a call needs to be setup. Similarly the BSC controls the base station functionality or resources in order to set up a call. Communication with the base station is preferably done via the LAPD (Link Access Protocol on the D channel, specified in "CCITT Q.921 (I.441)-ISDN User-Network Interface Data Link Layer Specification") protocol, while transcoder to mobility manager communication is done via LLC (Logical Link Control, that is part of the IEEE 802.2 standard) communication over a token ring. The transcoder includes a processor based card, designated front-end processor (FEP) 211 that essentially acts as a protocol converter and router between the mobility manager and base stations or switch via the respective MSIs as depicted. The FEP processors are responsible for providing communication paths between the mobility manager and the base stations as well as certain other processor-based functions of the BSC. Since a FEP can only support a certain number of communication paths, it is possible to have only a limited number of base stations routed through a single FEP. Thus multiple FEPS, 211–213 depicted, are deployed or allocated. Note if a FEP fails, all the communication paths to the base stations that FEP supported are lost. Because of this loss of one or more base stations if a FEP fails an n+1 redundancy scheme is implemented and FEP 214 (shown in dotted lines) is a standby FEP that will be deployed in lieu of FEP 211–213 in the event that one of them fails.

Further included in the transcoder 203 is a first or primary operations and maintenance processor ($OMP_P$) 215 for providing control and system level functions for the transcoder. The control and system level functions have a first priority or relative importance to the overall well-being or functionality of the BSC. The OMP is a processor card that controls the overall BSC and is responsible, for example, for initializing the system, responding to faults, managing all the devices or cards, and handling all system level functions. Obviously, the OMP is an, if not the most, important device in the BSC or transcoder since without the OMP the system or BSC will not be able to manage itself, properly assign resources within the transcoder, or initialize or respond to faults at run time. Therefore, it is preferably, assigned the highest priority or most important device in the system and is shown with a secondary or redundant $OMP_S$ 216. This represents 2n redundancy or n+1 since n=1. It may be appropriate, given the relative significance of the OMP to use 3n redundancy, sometimes referred to as a trinary voting redundancy scheme, where all boards "vote" with the majority being deemed correct. Even with this approach the principles and concepts disclosed here still apply.

One further resource or card in the transcoder or BSC is a is a card to do actual call processing. Call processing includes managing resources assigned by the OMP or mobility mangager, handling call setup and call tear down messaging, and handling handoff requests and processes. We call this processor the call processing processor (CPP) 219 (multiplicity shown). This is a true "pool" device, and given the finite processor resources, a given CPP can handle only a certain number of calls. Call capacity of a system or BSC is linked to the number of CPPs available to the BSC. These are usually determined and provisioned as part of system planning. A failure of one of these devices does not cause serious overall system failure in functionality or availability but rather normally only a modest overall decrease in call capacity. Note that barring an unlikely hardware failure, most or many failures are software related and thus are typically recoverable by a reset of the board or card. Hence a loss of a CPP typically means diminished call capacity for a brief period of time. Therefore planned redundancy for the pool of CPPs is not usually considered, beyond perhaps some extra capacity.

At the physical level the OMP, FEP, and CPP are functionally equivalent for the present principles and concepts to operate. It is further noted that the cards are each tied via the back plane one to another as depicted. The mobility manager is coupled to the same busses, specifically the LAN, but actually communicates as required with the OMP via one of the FEPs.

From the above discussions we can see that OMPs are the highest priority or most important processor, FEPs are next highest, and CPPs at least if some are available, are the least essential to a system. Therefore if an OMP fails and the redundant device takes over, it will preferably reallocate a CPP and reinitialize the board as a redundant OMP, subject to some optional conditions discussed below. When and if the failed OMP recovers, it can be reallocated to the CPP functionality and responsibilities. Thus OMP redundancy is preserved or reestablished essentially immediately preventing a double failure from taking the system down. In operation the BSC dynamically allocates processors or processing resources in order to maintain or for the sake of redundancy as follows. Upon a failure or fault in the control and system level functions that are supported by an OMP, either primary or secondary, means for detecting the fault will do so. Preferably this means for detecting the fault and dealing with it is the OMP, primary or secondary, that has not failed. Responsive to this fault or failure, a CPP for managing transcoder resources (a lower priority task) that have been assigned by the OMP so as to establish, teardown, and handoff calls, will be reallocated, preferably by the OMP that has not failed, to support the control and system level functions when or if a predetermined relationship corresponding to the first or OMP priority and the second or CPP priority exists.

Thus the reallocation is conditioned on the existence of a predetermined relationship. Preferably this includes the first priority exceeding the second priority but also may include the type of fault. Generally if a major fault such as a RAM parity error was detected the CPP would be immediately reallocated to provide OMP functionality. On the other hand if the priorities were properly related and the type of fault were judged minor, such as where a bus communications glitch has occurred the reallocation activity can be delayed for a time period such as twice the typical time to recover from such a fault to see if or allow for a possible recovery of the OMP. In the event that the same minor fault reoccurs a certain number of times within a certain time period or at a certain frequency, perhaps once per hour, the delaying actions can be foregone and appropriate repair steps initiated.

As suggested above the CPP will be selected from a multiplicity of CPPs for managing a multiplicity of the transcoder resources and reallocating the CPP will occur when the predetermined relationship includes the first priority exceeding the second priority but may optionally be constrained such that reallocation will not occur unless the multiplicity of CPPs satisfies or exceeds some threshold number of CPPs, which number will need to be determined based on individual circumstances, such as a minimum acceptable call capacity. Even when reallocation cannot occur because of the lack of lower level priority processors the BSC or transcoder discussed above that including one or more FEPs for inter-coupling the mobility manager with the base stations and the first OMP, where this inter-coupling has a third and intermediate priority that exceeds the second priority but is less than the first priority the means for reallocating can reallocate one of the FEPs to support the control and system level functions of an OMP.

Note that the respective priorities are set or selected by the user or operator presumably with some notion of importance or relevance to overall functionality. In situations such as the BSC these priorities may be clear-cut while in other apparatus they may not. In any event the priority will be up to the user. Selection of one CPP or one FEP to reallocate can be random, or based on card slot location in a card cage, or based on some figure of merit such as least busy. Reallocation can be delayed for some period of time while the present tasks being performed by a CPP are completed or offloaded. For example suppose the least loaded CPP is supporting two calls when the initial need to reallocate is determined. Reallocation can be delayed until these two calls are completed or the responsibility for the two calls can be transferred to another CPP.

The OMP, FEP, and CPP processor based cards are preferably based on Motorola 68030 processors and include SDRAM and PROM memory, miscellaneous support and signal processing hardware, and various back plane interface circuitry all as known and readily evident to one of ordinary skill. In the preferred embodiment the fault detection and control is handled by the OMP with actions taken by the central authority software task as directed by a fault translation process that handles all faults within the system. For example one fault or failure that may occur is a processor board will disappear from the LAN. This LAN is depicted in FIG. 2 as the bus that couples the OMP, CPP, and FEP together. Although not shown this LAN is also connected to the mobility manager. According to the 802.2 specification for this LAN, noted above, any device or resource that is connected to it sends out a periodic keep alive or heart beat message. If the OMP or redundant OMP does not see this keep-alive message from the other OMP or any other resource for a period of ten seconds the fault handling software within the OMP or surviving OMP, after some sanity checks that may include sending an inquiry to the missing OMP or resource directs the central authority of the OMP or surviving OMP to take the missing OMP or other resource out of service (OOS) and, if the missing resource was an OMP, the surviving OMP assumes full control of the BSC.

As one further example of the reallocation processes discussed herein with reference to the BSC, FIG. 3 depicts a ladder diagram showing reallocation of a call processing processor to become an operations and maintenance processor. FIG. 3 shows in a representative fashion a sequence of communications and instructions among the primary $OMP_P$ 215, the standby $OMP_S$ 216, and one of the CPPs 219. The process begins when the standby OMP fails to receive the keep alive message at 303, thus determining that the primary OMP has failed 305. The standby OMP assumes control of the BSC and tells the CPP to go OOS and re-initialize 307. The CPP reboots or reinitializes at 309 and comes back on the LAN at 311. The OMP 216 detects this presence on the LAN and directs the card that was CPP 219 to equip (initialize and install proper software and operate as a redundant OMP at 313. The new OMP (old CPP 219) has been reallocated as an OMP and so acknowledges the new role at 315. FIG. 3 further shows the original primary OMP 215 recovering and coming back on the LAN at 317 and being detected at 319. The OMP equips or directs this resource to equip as a CPP at 321.

In the nature of a review the discussion to date from a more general perspective has discussed a multi-processor based apparatus, such as a BSC, that is arranged and constructed to dynamically reallocate processors to provide redundant functionality. This apparatus includes a first processor that supports a first function and this first function has a first priority or first level of importance to the apparatus. The apparatus additionally includes means for detecting a fault in the first function and a second processor that supports a second function that has a second priority. The apparatus also includes means for reallocating, responsive to the fault, the second processor to support the first function when a predetermined relationship corresponding to the first priority and the second priority exists.

Optionally the first processor will be allocated to the second function upon recovery of the first processor from the fault. Preferably the reallocating the second processor to support the first function occurs when the predetermined relationship includes the first priority exceeding the second priority and this relationship may further correspond to a type of or classification of the fault. For example as earlier noted the reallocation of the second processor should occur immediately when the type of the fault is major, such as a memory parity error. On the other hand when the type or classification of the fault is minor (communications bus error or something else easily remedied) reallocation of the second processor may be delayed for a predetermined time sufficient to allow for a possible recovery of the first processor. However even a minor fault that is repeated to often or a predetermined number of times that will need to be experimentally determined may mitigate in favor of an immediate reallocation of the second processor.

Generally the second processor will be selected from a multiplicity of second processors supporting a multiplicity of the second functions and reallocating the second processor will occur when the predetermined relationship further corresponds to having the multiplicity of the second processors satisfy a threshold number of the second processors. While the above discussion has been in terms of two processors of two different priorities the apparatus can have three or more levels of priority associated with three or more different functions and processors or processor resources. For example if the apparatus included a third processor supporting a third function having a third priority that exceeds the second priority but is less than the first priority then reallocating the third processor to support the first function when the multiplicity of the second processors does not satisfy the threshold number of the second processors would be advisable. Note also that any lower priority processor could be redeployed or reallocated to support a higher priority task under the appropriate circumstances using the principles and concepts discussed herein.

Figure 4:
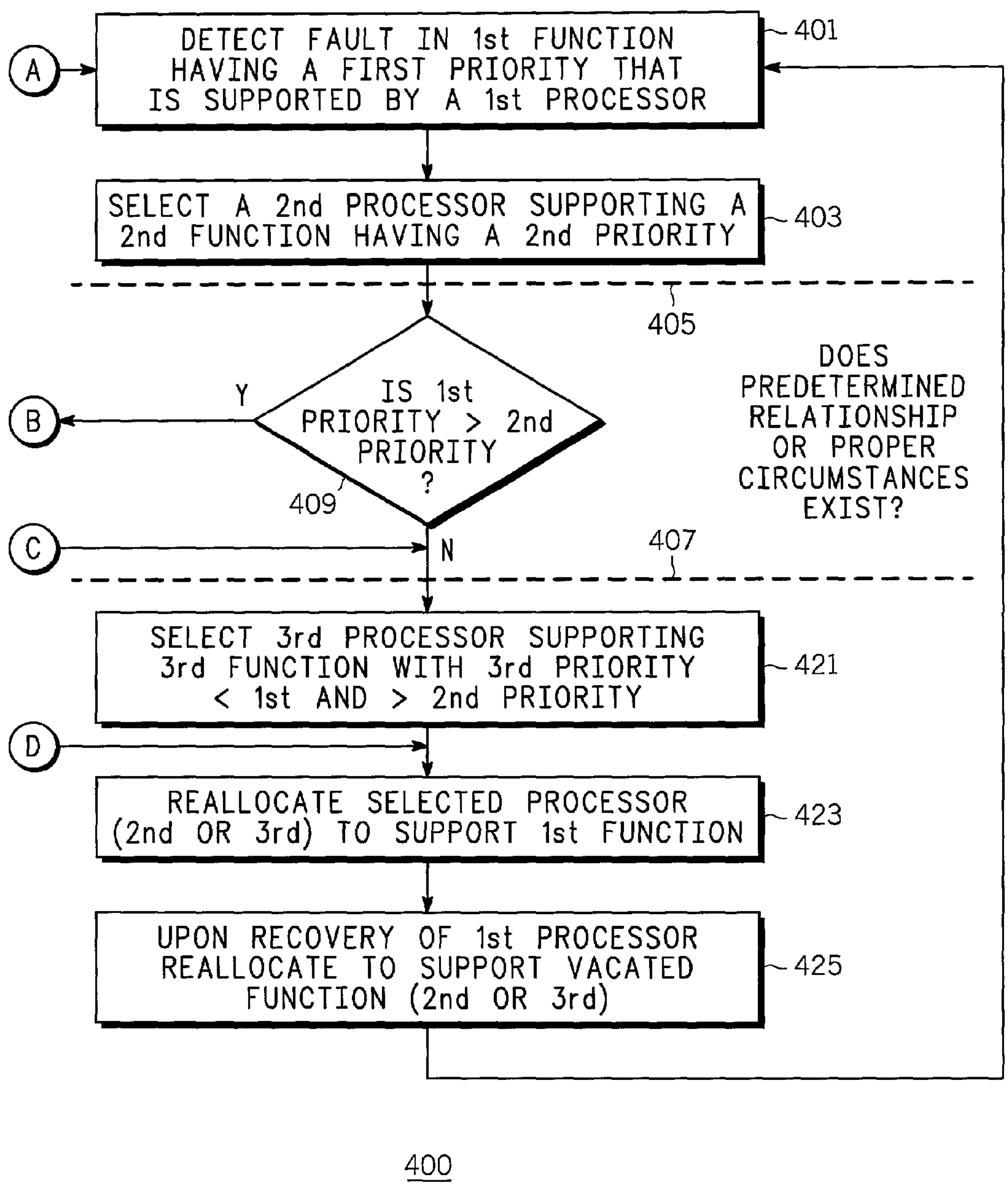
FIG. 4 and FIG. 5 together depict a preferred method of dynamically reallocating processors to provide redundant functionality according to the present invention.
Figure 5:
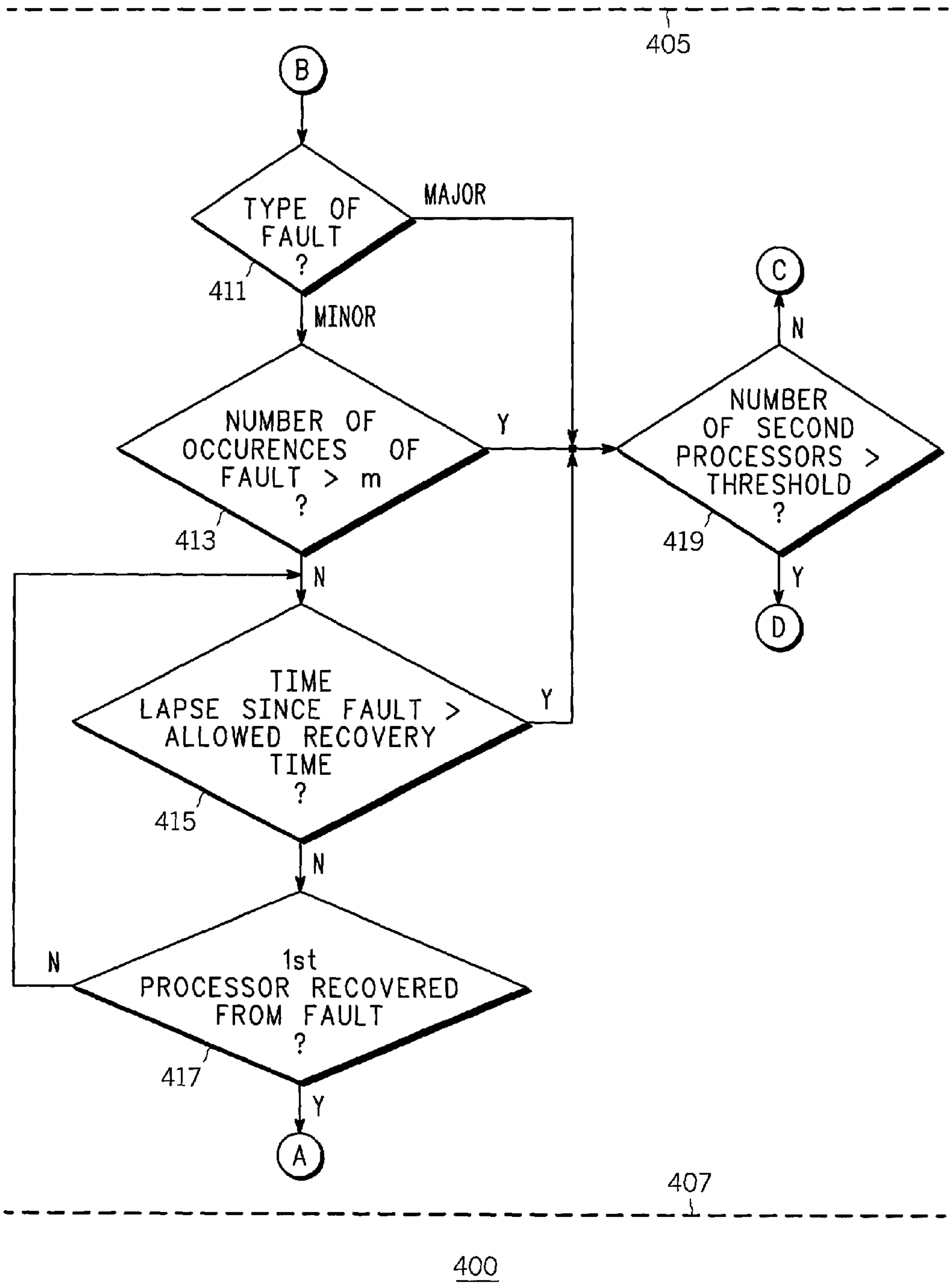

FIG. 4 and FIG. 5 together depict a flow chart of a preferred method 400 of dynamically reallocating processors to provide redundant functionality. The FIG. 4 and FIG. 5 diagrams are connected at the circles designated A,B,C, and D with the same indicators connected together to form one flow chart. The method is intended to operate in a multi-processor based apparatus, such as the BSC discussed above or any other distributed processor apparatus with multiple processors devoted to the same or similar functionality. This method will allow such an apparatus to maintain a prescribed level of redundancy and thus high availability even when multiple failures in critical elements or functions occur.

The method begins at step 401 by detecting a fault in a first function having a first priority, where a first processor supports the first function. At step 403 the method shows selecting a second processor supporting a second function having a second priority. The steps or procedures generally between dashed lines 405 and 407 are directed to determining whether a predetermined relationship or proper circumstances exist for a reallocation of processing resources to occur. As we will further discuss when the proper circumstances or predetermined relationship exists then reallocating, responsive to the fault, the second processor or sometimes a third processor to support the first function will occur. Note that it is unlikely that any one system or method will need to implement all of the tests that we will describe and it is equally clear that other tests could be conducted or other variables could enter into the determination of proper circumstances. We will attempt here to develop an appreciation for certain of the variables that singularly or in combination will yield a reasonable screen for reallocating resources from one function to another.

At step 409 the method tests to determine whether this predetermined relationship includes the situation where the first priority exceeds the second priority. If so then, via B, step 411 determines whether the predetermined relationship corresponds to either a major or minor type of fault. If the fault is classified as a minor fault step 413 determines whether the number of occurrences (it may be appropriate to also consider rate of occurrence) exceeds a prescribed threshold m. If not then step 415 determines whether the time lapsed since the fault occurred has exceeded an allowed recovery time. If not step 417 determines whether the first processor has recovered from the fault. If the first processor has recovered, the method returns, via A, to step 401 and if not, the method returns to step 415.

If from 411 the type of fault is major or the number of occurrences of the fault (or fault frequency) from 413 exceeds a threshold, or a time delay from 415 has lapsed, step 419 determines whether the number of second processors exceeds a threshold. This essentially makes sure that there are sufficient second processors to handle the second function in any particular apparatus. If not then via C or if the first priority did not exceed the second priority from step 409, step 421 results in selecting a third processor supporting a third function having a third priority that exceeds the second priority but is less than the first priority. If sufficient second processors are available from step 419 via D or after selecting a third processor at 421, the method undertakes step 423 where the selected processor, either second or third, is reallocated to support the first function. Step 425 then indicates that upon recovery of the first processor it is reallocated or assigned to support the vacated function (second or third depending on which processor was redeployed to support the first function). Thereafter the process returns to step 401. It will be clear to one of ordinary skill that the order of these processes in many cases can be varied. For example many of the tests if desired can be conducted as a general matter and prior to selecting a second or third processor.

By using these tests various levels of urgency can be incorporated into the reallocation. For example when the relationship further corresponds to a major fault and the step of reallocating can occur more or less immediately. In contrast when the fault is minor the step of reallocating can be delayed for a predetermined time sufficient to allow for a possible recovery of the first processor from the fault unless the fault has repeated a predetermined number of times. Of course the method can be extended to include more levels of priority and levels of processors and functions.

The processes and apparatus, discussed above, and the inventive principles thereof are intended to and will alleviate problems caused by prior art redundancy schemes. Using these principles and concepts of reallocating processing resources in order to maintain a proper level of redundancy will enhance system and equipment availability and potentially reduce costs for such availability. One of the principles used is the assignment of processing resources as redundant resources but not until they are in fact required. Thus previous systems that assigned or allocated additional resources for added redundancy will no longer need to do so. Therefore these resources can be actively deployed until specifically needed to fill the redundant role for a mission critical function. This added efficiency is expected to result in reduced overall costs of resources deployed and still maintain typical levels of availability.

Various embodiments of methods and apparatus for dynamically reallocating resources to provide redundancy in an efficient and timely manner have been discussed and described. It is expected that these embodiments or others in accordance with the present invention will have application to various fields using complex equipment. This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A method in a multi-processor based apparatus of dynamically reallocating processors to provide redundant functionality, the method including the steps of:

detecting a fault in a first function, the first function having a first priority, said first function supported by a first processor;

selecting a second processor supporting a second function different than the first function, the second function having a second priority; and reallocating, responsive to said fault, said second processor to support said first function when a predetermined relationship corresponding to said first priority and said second priority exists, wherein said step of reallocating said second processor to support said first function occurs when said predetermined relationship includes said first priority exceeding said second priority, wherein said second processor is selected from a multiplicity of second processors supporting a multiplicity of said second functions and wherein said step of reallocating occurs when said predetermined relationship further corresponds to having said multiplicity of said second processors satisfy a threshold number of said second processors.

2. The method of claim 1 further including a step of selecting a third processor supporting a third function having a third priority that exceeds said second priority but is less than said first priority and reallocating said third processor to support said first function when said multiplicity of said second processors does not satisfy said threshold number of said second processors.

3. A multi-processor based apparatus arranged and constructed to dynamically reallocate processors to provide redundant functionality, the apparatus comprising in combination:

a first processor supporting a first function, the first function having a first priority;

means for detecting a fault in said first function;

a second processor supporting a second function different from the first function, the second function having a second priority; and means for reallocating, responsive to said fault, said second processor to support said first function when a predetermined relationship corresponding to said first priority and said second priority exists, wherein said reallocating said second processor to support said first function occurs when said predetermined relationship includes said first priority exceeding said second priority, wherein said second processor is selected from a multiplicity of second processors supporting a multiplicity of said second functions and wherein said reallocating said second processor occurs when said predetermined relationship further corresponds to having said multiplicity of said second processors satisfy a threshold number of said second processors.

4. The apparatus of claim 3 further including a third processor supporting a third function having a third priority that exceeds said second priority but is less than said first priority and reallocating said third processor to support said first function when said multiplicity of said second processors does not satisfy said threshold number of said second processors.

5. A base station controller (BSC) for controlling base stations and inter-coupling the base stations and a network switch in a wireless phone network, the base station controller being multi-processor based and arranged and constructed to dynamically reallocate processors to provide redundant functionality within the BSC, the BSC comprising in combination:

a mobility manager for handling all base station resource assignments and a transcoder for supporting all calls, said transcoder further including;

means for inter-coupling the base stations and the network switch;

a first operations and maintenance processor (OMP) for providing control and system level functions for the transcoder, said control and system level functions having a first priority;

means for detecting a fault in said control and system level functions;

a call processing processor (CPP) for managing transcoder resources that are assigned by said OMP to establish and handoff calls, said managing having a second priority; and means for reallocating, responsive to said fault, said CPP to support said control and system level functions when a predetermined relationship corresponding to said first priority and said second priority exists.

6. The BSC of claim 5 wherein said reallocating said CPP to support said control and system level functions occurs when said predetermined relationship includes said first priority exceeding said second priority and further corresponds to a type of fault, said reallocating said CPP occurring immediately when said type of said fault is major.

7. The BSC of claim 5 wherein said reallocating said CPP to support said control and system level functions occurs when said predetermined relationship includes said first priority exceeding said second priority and further corresponds to a type of fault, said reallocating said CPP is delayed for a predetermined time sufficient to allow for a possible recovery of said first OMP from said fault when said type of said fault is minor unless said fault has repeated a predetermined number of times.

8. The BSC of claim 5 wherein said CPP is selected from a multiplicity of CPPs for said managing a multiplicity of said transcoder resources and wherein said reallocating said CPP occurs when said predetermined relationship includes said first priority exceeding said second priority and further corresponds to having said multiplicity of said CPPs satisfy a threshold number of said CPPs.

9. The BSC of claim 8 further including a front end processor (FEP) for inter-coupling said mobility manager with the base stations and said first OMP, said inter-coupling having a third priority that exceeds said second priority but is less than said first priority and means for reallocating further for reallocating said FEP to support said control and system level functions when said multiplicity of said CPPs does not satisfy said threshold number of said CPPs.

* * * * *